United States Patent [19]

Katayama et al.

[11] Patent Number: 4,660,852
[45] Date of Patent: Apr. 28, 1987

[54] CRASH ENERGY ABSORBER FOR A VEHICLE STEERING WHEEL

[75] Inventors: Kazuo Katayama, Kure; Katumi Ooishi, Hiroshima; Toshiake Ogawa, Hiroshima; Masaru Batai, Hiroshima; Mitsuru Kataoka, Hiroshima, all of Japan

[73] Assignee: Mazda Motor Corporation, Hiroshima, Japan

[21] Appl. No.: 771,729

[22] Filed: Sep. 3, 1985

[30] Foreign Application Priority Data

Sep. 3, 1984 [JP] Japan .................................. 59-184171
Sep. 3, 1984 [JP] Japan .................................. 59-184172
Sep. 3, 1984 [JP] Japan .......................... 59-133632[U]

[51] Int. Cl.⁴ ............................................. B60R 21/02
[52] U.S. Cl. ...................................... 280/750; 74/492; 280/751
[58] Field of Search ............... 280/750, 748, 731, 751; 74/492, 493, 552

[56] References Cited

U.S. PATENT DOCUMENTS

| | | | |
|---|---|---|---|
| 3,540,304 | 11/1970 | Weiss | 74/492 |
| 3,659,476 | 5/1972 | Wilfert | 280/750 |
| 3,801,123 | 4/1974 | Jira | 280/731 |
| 3,930,665 | 1/1976 | Ikawa | 280/751 |
| 4,098,525 | 7/1978 | Schwanz | 280/751 |
| 4,123,948 | 11/1978 | Zeller | 74/492 |
| 4,200,309 | 4/1980 | Korn | 280/750 |
| 4,390,193 | 6/1983 | Strahan | 280/750 |

FOREIGN PATENT DOCUMENTS

| | | | |
|---|---|---|---|
| 156453 | 9/1983 | Japan | 74/492 |
| 152660 | 9/1983 | Japan . | |

Primary Examiner—John J. Love
Assistant Examiner—Everett G. Diederiks, Jr.
Attorney, Agent, or Firm—Fleit, Jacobson, Cohn & Price

[57] ABSTRACT

A crash energy absorber mounted on the tip end of steering wheel including a structure including a top plate and a pair of side plates extending substantially perpendicularly to the top plate at the opposite sides of the top plate to define a substantially rectangular space with the top plate, and at least one reinforcement extending diagonally in the space defined by the plate structure. The crash energy absorber absorbs a crash energy applied thereto in any direction so as to relieve crash shock from a driver.

12 Claims, 7 Drawing Figures

CRASH ENERGY ABSORBER FOR A VEHICLE STEERING WHEEL

BACKGROUND OF THE INVENTION

1. Field of the Invention

This invention relates to a crash energy absorber for a steering shaft, and more particularly to an absorber mounted on the tip end portion of a steering shaft for absorbing a crash energy to protect a driver in case of a accident.

2. Description of the Prior Art

A vehicle steering wheel is mounted on the tip end portion of a steering shaft usually by means of a bolt and nut mechanism. Thus, there is a danger that the driver hit his body at the tip end portion of the steering shaft in case of a crash accident. For the driver's safety it is known that an energy absorbing member is disposed to cover the tip end portion so that the driver may not hit his body at the tip end portion directly and the absorbing member can absorbs the crash energy to relieve the crash shock from the driver. For example, in Japanese Patent Public Disclosure No.58-152660 published on Sept. 10, 1983, there is disclosed a crash energy absorbing structure including a member of U shaped sectional configuration having a top plate covering the tip end of the steering shaft and a pair of parallel side plates extending downwardly from the opposite sides of the top plate perpendicularly to the top plate. The proposed structure is considered as having a desired stiffness against external forces applied thereto in the three different directions, that is, a force in the direction perpendicular to the top plate which is the axial direction of the steering shaft, a force in the direction perpendicular to the axial direction of the steering shaft and parallel with the side plates and a force perpendicular to both the top plate and the side plates so that the crash energy absorbing structure can provide a desirable crash energy absorbing effect for the forces in these three directions. However, the proposed structure is insufficient in stiffness against a diagonally directed force which is applied at a corner portion between the top plate and the side plate so that the energy absorbing structure may deform without showing any absorbing characteristics under such diagonal force. In order to solve the problem, it may be a way to increase the thickness of the member or to provide end plates which are perpendicular to both the top and side plates. However, the solution is not recommendable because the structure becomes too strong against the aforementioned three perpendicular forces.

SUMMARY OF THE INVENTION

It is therefore an object of the present invention to provide an improved crash shock absorber for a vehicle steering shaft which is mounted on the tip portion of the steering shaft.

It is a further object of the present invention to provide an improved crash energy absorber having a satisfactory stiffness not only against the three perpendicular forces but against the diagonal crash force applied at corner portions between the top plate and the side plates.

According to the present invention, there is provided a crash energy absorber for a steering shaft characterized by the fact that the energy absorber comprises a structure including a substantially rectangular top plate, pair of side plates extending substantially perpendicularly to the top plate at the opposite sides of the top plate to define a substantially rectangular space with the top plate, at least one reinforcement extending diagonally in the space defined by the top plate and the side plates and secured to the structure at least at the opposite ends thereof. The structure may preferably be of a hollow structure having a bottom plate in addition to the top plate and the side plates. It is preferred that the reinforcement be made of a sheet metal. Alternatively, the reinforcement may be made of any other material, such as a rod, a tube and the like. It is preferred that a pair of reinforcements be provided at spaced apart portions. Where the reinforcement is made of a sheet metal member, the reinforcement may have its widthwise direction oriented prependicularly or parallelly to the top plate. The reinforcement may be of a V shaped configuration with the opposite ends secured to the corner portions between the top plate and the side plates and an intermediate portion secured to the bottom plate. Securing of the reinforcement may be made by means of weldings, bolts, and the like.

The side plates are preferably formed with slits of an appropriate size so that the stifness of the structure may be properly determined to provide a desirable crash absorbing ability. The bottom plate is preferably provided with extensions at the opposite end portions thereof where the structure is secured rigidly to spokes of the steering wheels by fasteners such as screws.

According to the present invention, the reinforcement provides a sufficient resistance to crash shocks in the diagonal direction of the plate structure. When an external force is applied at the corner portion in a diagonal direction, the reinforcement tends to be bent to thereby absorb the crash shocks. As the result, the crash energy absorber according to the present invention provides a desirable relief effect against the crash shocks in any direction applied thereto.

DESCRIPTION OF THE PREFERRED EMBODIMENT

Figure 1:
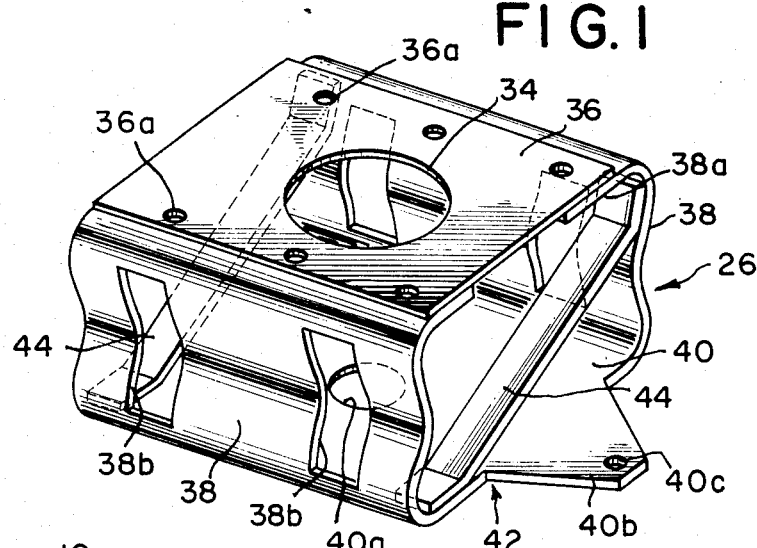
FIG. 1 is a perspective view of a crash energy absorber in accordance with one embodiment of the present invention.
Figure 2:
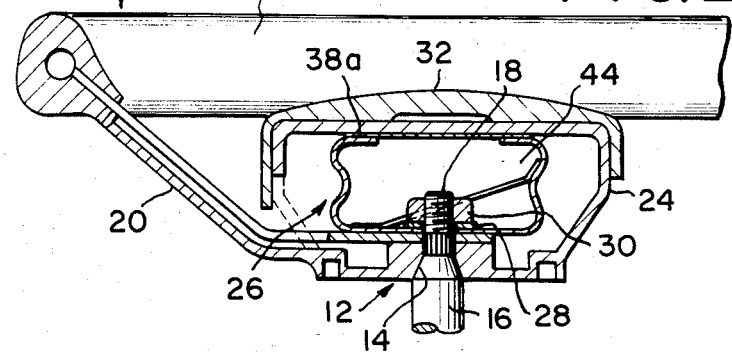
FIG. 2 is a fragmentary sectional view showing the crash energy absorber in FIG. 1 mounted on a steering shaft.

There now follow descriptions of preferred embodiments of the present invention with reference to the accompanying drawings;

Referring now to FIG. 2, a steering wheel 10 is provided with a core portion 12 at the center portion thereof. The core portion 12 is formed with a hole 14 which is engaged with a boss portion 18 formed at the tip end of a steering shaft 16 so that the steering wheel can be fixed to the steering shaft 16. The hole 14 is formed with an internal axial serrations which are engaged with external axial serrations on the boss portion 18 of the steering shaft 16 so that a relative rotative movement is prevented between the steering wheel 10 and the steering shaft 16. The core portion 12 is connected to a toroidal grip portion 22 by spokes 20. The core portion 12 is formed integrally with a core cover 24 which covers the boss portion 18 with a space therebetween. A crash energy absorber 26 of a hollow, substantially rectangular cross-section is disposed between the inner surface of the core cover 24 and the core portion 12. The energy absorber 26 is fixed to the steering shaft 16 together with the core portion 12 of the steering wheel 10 by means of a nut 30. A washer 28 is disposed between the nut 30 and the absorber 26. The outside of the core cover 24 is covered with a cap 32. As shown in FIG. 1, the crash energy absorber 26 comprises a sheet metal structure 42 having a top plate 36 formed with an opening 34 at the center portion thereof for providing an access to the nut 30 therethrough. A body structure is provided and has a pair of side plates 38 formed with top flanges 38a to which the top plate 36 is welded. The side plates 38 extend downwardly and substantially perpendicularly to the top plate 36 and a bottom plate 40 is integrally formed with the side plates 28 and extend substantially parallelly with the top plate 36. The crash energy absorber 26 is also provided with a pair of reinforcements 44 which are disposed diagonally across the cross section of the space defined in the structure 42. In other words, the reinforcements extend diagonally from one corner portion between the top plate 36 and one of the side plates 38 to a diagonally opposite corner portion between the bottom plate 40 and the other of the side plates 38. In this embodiment, the reinforcements 44 are of elongated plate members with their widthwise directions oriented in parallel with both the top and side plates 38, that is, the longitudinal direction of the space of the rectangular cross-section defined by the structure. The reinforcements 44 are welded inside of the upper portion of the side plate 38 at one ends and in the vicinity of the corner portion of the bottom plate 40 at the other ends. The reinforcements are disposed at the opposite sides of the boss portion 18. The bottom plate 36 is formed with a hole 40a at the center portion thereof into which the boss portion 18 is inserted. In the side plates 38, there are provided rectangular openings 38b to obtain a desirable stiffness of the side plate 38. The bottom plate 40 is provided with extensions 40b with screw opening 40c. Applying screws (not shown in Figures) to the openings 40c provides a rigid bond between the bottom plate 40 and the spoke portions 20 of the steering wheel 10.

Figure 3:
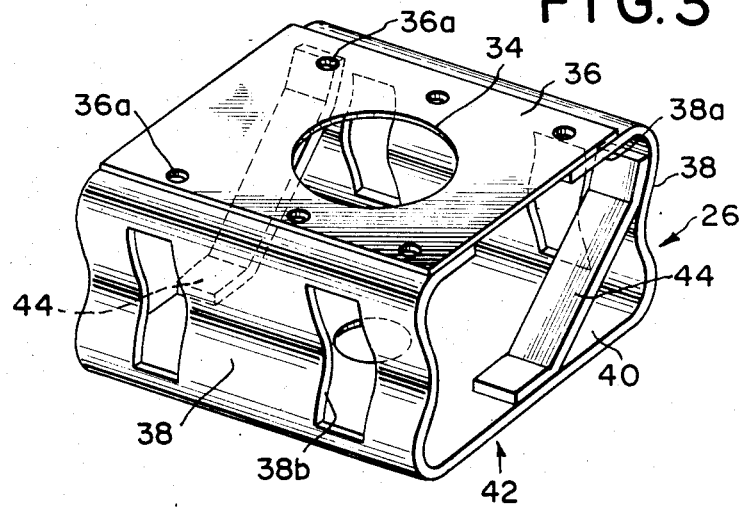
FIG. 3 is a fragmentary sectional view showing another embodiment of the present invention.

In FIG. 3, there is shown another embodiment of the crash energy absorber 26 wherein the reinforcements 44 are fixed to the center portion of the bottom plate 40 at one ends thereof.

Figure 4:
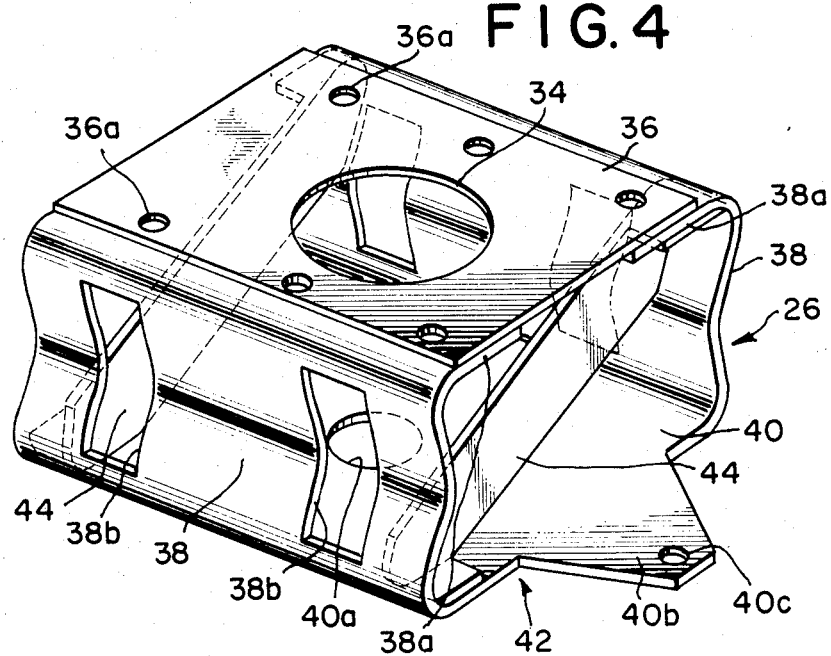
FIG. 4 is a perspective view showing a further embodiment of the present invention.
Figure 5:
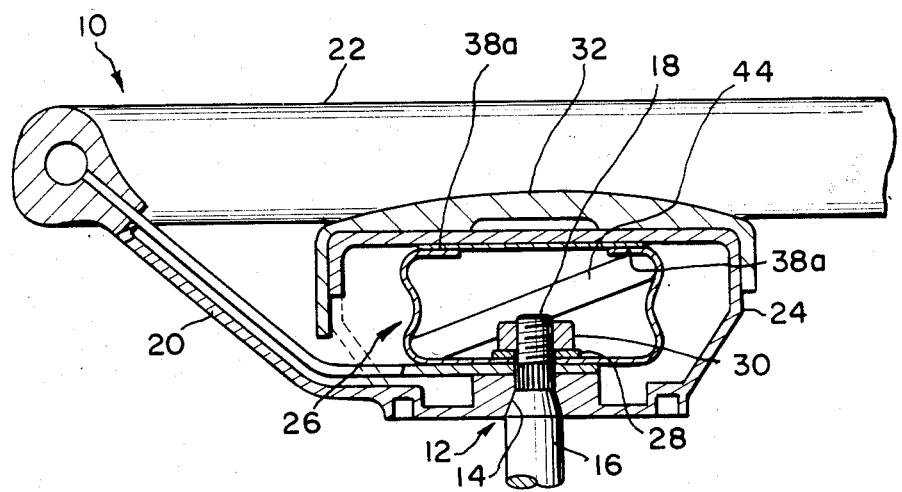
FIG. 5 is a fragmentary sectional view showing the crash energy absorber in FIG. 4 mounted on a steering shaft.

FIGS. 4, and 5 show further embodiment of a crash energy absorber 26 of the present invention wherein the reinforcements 44 are of plate members which are arranged with their surfaces directed substantially perpendicularly to the top and bottom plates 36 and 40. The reinforcements 44 are fixed at one ends, to one of the flanges 38a and to the bottom plate 40 at the other ends at the diagonally opposite corner portion between the bottom plate 40 and the side plate 38.

Figure 6:
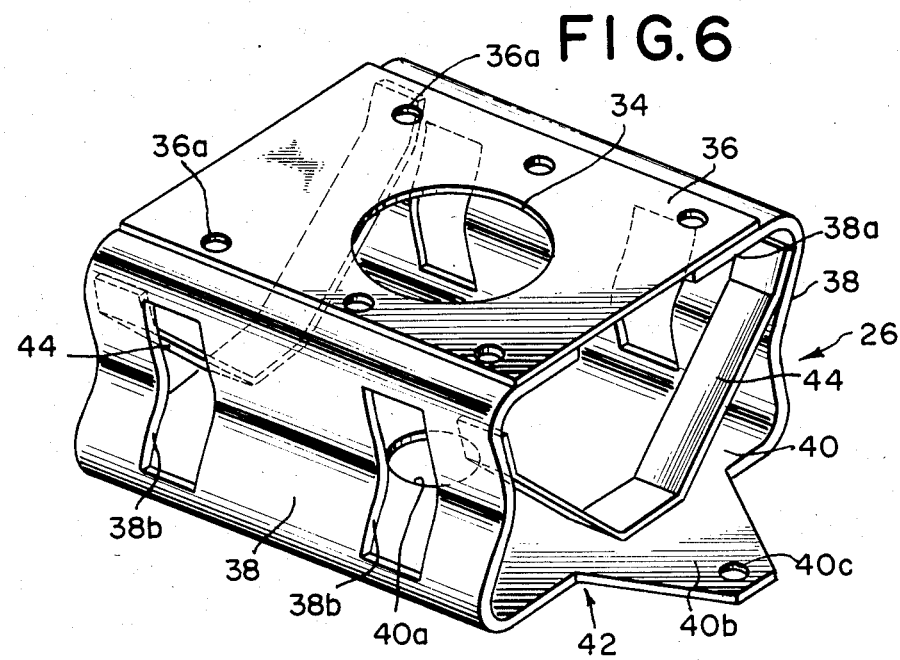
FIG. 6 is a perspective view showing a still further embodiment of the present invention; and, FIG. 7 is a fragmentary sectional view showing the crash energy absorber in FIG. 6 mounted on a steering shaft.
Figure 7:
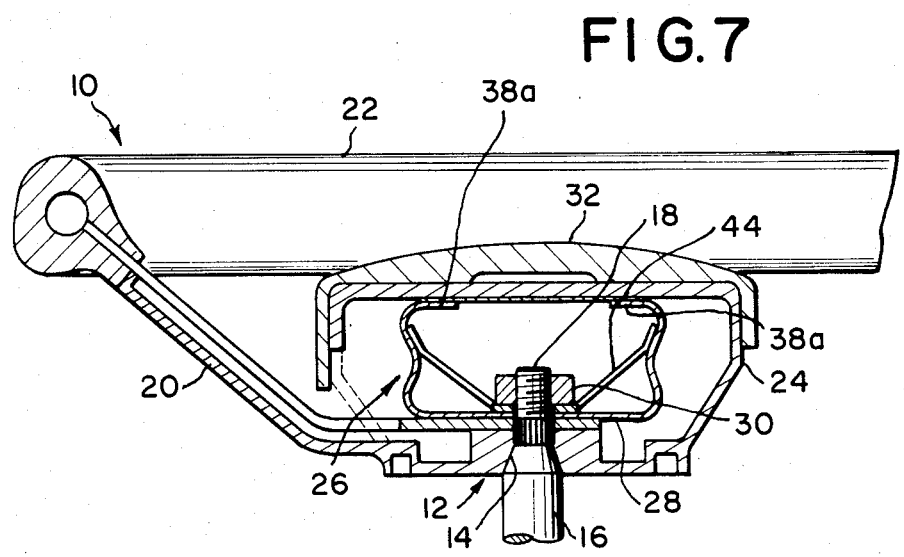

In FIGS. 6 and 7, there is shown a still further embodiment of the crash energy absorber 26 according to the present invention wherein the reinforcements 44 are of V shaped configuration. Each reinforcements is welded at the opposite ends to the flanges 38a and an intermediate portion of the bottom plate 40.

In the aforementioned crash energy absorber 26, when a crash shock is applied thereto in the direction of the steering shaft, the crash energy absorber 26 can deform in this direction of producing bucklings in the side plates 38 to thereby absorb the crash energy. When the crash shock is applied in the direction parallel to both the top and side plates, the side plates 38 are subjected to shear deformations through which the crash energy is absorbed. In this case, since the side plates 38 are formed with the openings 38b to provide an appropriate stiffness for the crash energy absorber 26, the crash energy absorber 26 can produce shear deformations providing a desirable absorption of the crash energy. When the crash shock is applied in the direction perpendicular to the side plates 38, bending deformations are produced in the side plates 38 to absorb the crash energy. Further, in case where the crash shock is applied in the diagonal direction of the cross section of the structure 42, the reinforcements 44 resist the crash shock to absorb the crash energy.

Therefore, the crash energy absorber 26 in accordance with the present invention can absorb the crash energy in any direction to provide a sufficient crash shock relief effect. In particular, the crash energy absorber 26 improves an energy absorbing effect for the diagonal crash shock added thereto.

While the present invention has been described with reference to specific examples it is not confined to the details set forth, but is intented to cover such modification or changes that may come within the scope of the following claims.

We claim:

1. A crash energy absorber for a steering wheel mechanism having a steering shaft formed with a boss portion at a tip end and a cover means so that the crash energy absorber is disposed between the boss portion and the cover means, said crash energy absorber comprising:

a plate structure including at least a substantially rectangular top plate, a side plate extending from each of two opposite ends of said top plate, substantially perpendicular to said top plate and a bottom plate connected with the side plates in parallel with said top plate so as to define a substantially rectangular space and at least one reinforcement extending diagonally between said bottom plate and an upper corner portion located between said top plate and one side plate, said at least one reinforcement being secured adjacent said upper corner portion at an upper end and secured to said bottom plate at a lower end and said top plate and said bottom plate defining openings through which said plate structure engages with the boss portion so that the crash absorber is mounted on the steering wheel mechanism to absorb the impact of a force in a direction perpendicular to said top plate which is the axial direction of the steering shaft, a force in a direction perpendicular to the axial direction of the steering shaft and parallel with said side plates, a force in a direction perpendicular to both said top plate and said side plates, and a diagonal crash force applied at corner portions located between said top plate and said side plates.

2. The crash energy absorber in accordance with claim 1, wherein said reinforcement is a plate member having an upper surface facing a lower surface of said top plate.

3. The crash energy absorber in accordance with claim 2, wherein said reinforcement is provided in said plate structure on two sides of the boss portion of the steering shaft.

4. The crash energy absorber in accordance with claim 2, wherein said bottom plate includes an extension fixed to a spoke portion of the steering wheel.

5. The crash energy absorber in accordance with claim 2, wherein each of said side plates includes at least one rectangular slit.

6. The crash energy absorber in accordance with claim 1, wherein said reinforcement is of a V-shaped configuration, bent at an intermediate portion thereof projected downwardly.

7. The crash energy absorber in accordance with claim 6, wherein said reinforcement is a plate member having an upper surface facing a lower surface of said top plate.

8. The crash energy absorber in accordance with claim 7, wherein each of said at least one reinforcement is fixed at said lower end to a central portion of said bottom plate.

9. The crash energy absorber in accordance with claim 1, wherein said side plates are formed integrally with said bottom plate and each of said side plates include a bent portion at a top end portion which is bent so that said top plate is fixed to said bent portions of said side plates.

10. The crash energy absorber in accordance with claim 9, wherein each of side of said side plates includes at least one rectangular slit.

11. The crash energy absorber in accordance with claim 1, wherein said lower end of said reinforcement is fixed to a central portion of said bottom plate.

12. The crash energy absorber in accordance with claim 1, wherein said reinforcement extends diagonally and downwardly and is fixed at said lower end to a corner portion located between the other of said side plates and said bottom plate.

* * * * *